United States Patent
Fang et al.

(10) Patent No.: US 12,112,182 B2
(45) Date of Patent: Oct. 8, 2024

(54) SCREEN LOCKING METHOD AND MOBILE TERMINAL

(71) Applicant: Huawei Device Co., Ltd., Dongguan (CN)

(72) Inventors: Chao Fang, Shanghai (CN); Zhang Gao, Shanghai (CN); Yuanqiang Ni, Shanghai (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

(21) Appl. No.: 15/125,535

(22) PCT Filed: Mar. 12, 2014

(86) PCT No.: PCT/CN2014/073316
§ 371 (c)(1),
(2) Date: Sep. 12, 2016

(87) PCT Pub. No.: WO2015/135165
PCT Pub. Date: Sep. 17, 2015

(65) Prior Publication Data
US 2017/0115998 A1   Apr. 27, 2017

(51) Int. Cl.
*H04M 1/72448*   (2021.01)
*G06F 3/04847*   (2022.01)
(Continued)

(52) U.S. Cl.
CPC .......... *G06F 9/451* (2018.02); *G06F 3/04847* (2013.01); *G06F 3/04883* (2013.01);
(Continued)

(58) Field of Classification Search
CPC .. G06F 9/451; G06F 3/04847; G06F 3/04883; H04M 1/72519; H04M 1/67;
(Continued)

(56) References Cited

U.S. PATENT DOCUMENTS 9,141,617 B1 * 9/2015 Gargi ..................... G06F 16/435
9,253,609 B2 * 2/2016 Hosier, Jr. ............... H04L 51/52
(Continued)

FOREIGN PATENT DOCUMENTS

CN    101076162 A    11/2007
CN    101252746 A    8/2008
(Continued)

OTHER PUBLICATIONS

Suelue. 'How can I find out the the details . . . ?' In answers.microsoft.com [online]., May 23, 2011; [retrievied on Nov. 5, 2019]. Retrieved from the Internet: <https://answers.microsoft.com/en-us/windows/forum/all/how-can-i-find-out-the-the-details-of-the-pictures/bc50e95d-78b8-4870-84e6-a44df3775172> (Year: 2011).*
(Continued)

*Primary Examiner* — Benjamin Smith
(74) *Attorney, Agent, or Firm* — Conley Rose, P.C.

(57) ABSTRACT

An embodiment of the present invention discloses a screen locking method, including: displaying a first lock screen interface in a lock screen state; in response to a preset gesture operation input by a user on the first lock screen interface, displaying a first lock screen configuration interface in the lock screen state, wherein the first lock screen configuration interface is provided with a first function option for commenting on a current lock screen background, and the first function option is represented by a heart-shaped icon; in response to an operation that is performed by the user for triggering the first function option, identifying the first picture as a picture fond of by the user. Thus, increasing variability of a lock screen background, improving switching efficiency, and enhancing a feeling of freshness of a user on a lock screen.

28 Claims, 6 Drawing Sheets

(51) Int. Cl.
   *G06F 3/04883* (2022.01)
   *G06F 9/451* (2018.01)
   *H04M 1/67* (2006.01)
   *H04M 1/724* (2021.01)
   *H04M 1/72427* (2021.01)
(52) U.S. Cl.
   CPC ............. *H04M 1/67* (2013.01); *H04M 1/724* (2021.01); *H04M 1/72427* (2021.01); *H04M 1/72448* (2021.01)
(58) Field of Classification Search
   CPC ............ H04M 1/724; H04M 1/72427; H04M 1/72448; H04M 1/724631; H04M 1/724634
   See application file for complete search history.

(56) References Cited

U.S. PATENT DOCUMENTS

| | | | |
|---|---|---|---|
| 9,632,664 B2* | 4/2017 | Foss | H04L 67/60 |
| 2007/0195105 A1* | 8/2007 | Koberg | H04M 1/72544 |
| | | | 345/582 |
| 2008/0133649 A1 | 6/2008 | Pennington et al. | |
| 2009/0125934 A1* | 5/2009 | Jones | H04N 7/163 |
| | | | 725/28 |
| 2009/0178007 A1 | 7/2009 | Matas et al. | |
| 2009/0195515 A1 | 8/2009 | Lee | |
| 2009/0259968 A1 | 10/2009 | Hsieh et al. | |
| 2010/0075649 A1* | 3/2010 | Teng | H04M 1/72544 |
| | | | 455/418 |
| 2010/0159995 A1* | 6/2010 | Stallings | G06F 3/0488 |
| | | | 455/566 |
| 2010/0306705 A1* | 12/2010 | Nilsson | G06F 3/0488 |
| | | | 715/835 |
| 2011/0010433 A1* | 1/2011 | Wilburn | H04L 41/22 |
| | | | 709/224 |
| 2011/0119625 A1* | 5/2011 | Moon | G06F 3/048 |
| | | | 715/810 |
| 2011/0313861 A1* | 12/2011 | Lawrence, III | G06Q 30/02 |
| | | | 705/14.64 |
| 2012/0009896 A1* | 1/2012 | Bandyopadhyay | G06F 1/1643 |
| | | | 455/411 |
| 2012/0120110 A1* | 5/2012 | Chae | G06T 11/00 |
| | | | 345/660 |
| 2012/0259707 A1* | 10/2012 | Thielke | G06Q 30/02 |
| | | | 705/14.64 |
| 2012/0284673 A1 | 11/2012 | Lamb et al. | |
| 2012/0286925 A1 | 11/2012 | Huang | |
| 2012/0306910 A1 | 12/2012 | Kim et al. | |
| 2012/0331548 A1* | 12/2012 | Tseng | G06F 21/31 |
| | | | 726/19 |
| 2013/0050250 A1* | 2/2013 | Brinda | H04M 1/72544 |
| | | | 345/619 |
| 2013/0053105 A1 | 2/2013 | Lee et al. | |
| 2013/0069962 A1* | 3/2013 | Nealer | H04M 1/72427 |
| | | | 345/522 |
| 2013/0162571 A1 | 6/2013 | Tamegai | |
| 2013/0169573 A1 | 7/2013 | Nishio | |
| 2013/0283199 A1 | 10/2013 | Selig et al. | |
| 2013/0335450 A1 | 12/2013 | Han et al. | |
| 2013/0346865 A1* | 12/2013 | Yuan | G06F 3/0484 |
| | | | 715/720 |
| 2014/0019253 A1* | 1/2014 | Ricasata | G06Q 30/0241 |
| | | | 705/14.64 |
| 2014/0040035 A1* | 2/2014 | Cusack | G06Q 30/02 |
| | | | 705/14.61 |
| 2014/0092046 A1 | 4/2014 | Tian et al. | |
| 2014/0143355 A1* | 5/2014 | Berdis | H04L 51/04 |
| | | | 709/206 |
| 2014/0245202 A1* | 8/2014 | Yoon | G06F 3/0482 |
| | | | 715/765 |
| 2014/0282016 A1* | 9/2014 | Hosier, Jr. | G06F 3/017 |
| | | | 715/733 |
| 2015/0121312 A1 | 4/2015 | Li | |
| 2015/0133199 A1* | 5/2015 | Lee | G06Q 30/0241 |
| | | | 455/566 |
| 2016/0259497 A1* | 9/2016 | Foss | G06F 3/04883 |
| 2017/0115998 A1 | 4/2017 | Fang et al. | |
| 2018/0350144 A1* | 12/2018 | Rathod | G06Q 20/3224 |

FOREIGN PATENT DOCUMENTS

| | | |
|---|---|---|
| CN | 101404687 A | 4/2009 |
| CN | 101561743 A | 10/2009 |
| CN | 101656784 A | 2/2010 |
| CN | 101853131 A | 10/2010 |
| CN | 102203705 A | 9/2011 |
| CN | 102497469 A | 6/2012 |
| CN | 102520940 A | 6/2012 |
| CN | 102707870 A | 10/2012 |
| CN | 102904929 A | 1/2013 |
| CN | 102999262 A | 3/2013 |
| CN | 103019727 A | 4/2013 |
| CN | 103034445 A | 4/2013 |
| CN | 103116458 A | 5/2013 |
| CN | 103269403 A | 8/2013 |
| CN | 103294362 A | 9/2013 |
| CN | 103312820 A | 9/2013 |
| CN | 103345355 A | 10/2013 |
| CN | 103345356 A | 10/2013 |
| CN | 103345696 A | 10/2013 |
| CN | 103365600 A | 10/2013 |
| CN | 103425427 A | 12/2013 |
| CN | 103513988 A | 1/2014 |
| CN | 103543903 A | 1/2014 |
| CN | 103543910 A | 1/2014 |
| CN | 103558973 A | 2/2014 |
| CN | 103559731 A | 2/2014 |
| CN | 104885049 A | 9/2015 |
| CN | 108319415 B | 2/2020 |
| EP | 2416546 A1 | 2/2012 |
| JP | 2008244977 A | 10/2008 |
| JP | 2012160874 A | 8/2012 |
| JP | 2013134695 A | 7/2013 |
| JP | 2013137722 A | 7/2013 |
| JP | 2014528213 A | 10/2014 |
| JP | 2014235526 A | 12/2014 |
| KR | 20100134884 A | 12/2010 |
| KR | 20130045750 A | 5/2013 |
| KR | 20130142310 A | 12/2013 |
| TW | 200943164 A | 10/2009 |
| WO | 2011/098617 A1 | 8/2011 |
| WO | 2014008828 A1 | 1/2014 |
| WO | WO-2015135165 A1 * | 9/2015 ......... G06F 3/04847 |

OTHER PUBLICATIONS

Machine Translation and Abstract of Chinese Publication No. CN103513988, Jan. 15, 2014, 11 pages.
Foreign Communication From A Counterpart Application, Chinese Application No. 201810188201.7, Chinese Office Action dated Jul. 30, 2019, 11 pages.
Foreign Communication From A Counterpart Application, Japanese Application No. 2018-237189, Japanese Office Action dated Dec. 16, 2019, 5 pages.
Foreign Communication From A Counterpart Application, Japanese Application No. 2018-237189, English Translation of Japanese Office Action dated Dec. 16, 2019, 6 pages.
Tangshan Juren, The phone should play like this! Creative Locker, PConline original, Feb. 26, 2013, with the English Abstract, 6 pages.
Creative Locker, Jan. 8, 2013, URL:https://www.youtube.com/watch?v=UqVULPv-mbc, 1 minute 21 seconds of video.

* cited by examiner

SCREEN LOCKING METHOD AND MOBILE TERMINAL

CROSS REFERENCE TO RELATED APPLICATIONS

The present application claims priority under 35 U.S.C. § 365 to International Patent Application No. PCT/CN2014/073316 filed Mar. 12, 2014 which is incorporated herein by reference into the present disclosure as if fully set forth herein.

TECHNICAL FIELD

The present invention relates to the field of communications technologies, and in particular, to a screen locking method and a mobile terminal.

BACKGROUND

With popularity of an intelligent mobile terminal, such as a mobile phone and a tablet, and rapid development of a mobile Internet, there are an increasing number of users who use an intelligent mobile terminal. A screen locking function, which is a first impression made by an intelligent mobile terminal on a user, has become one of standard applications of the intelligent mobile terminal. Therefore, the screen locking function belongs to an application extremely frequently used by a user. However, only some static functions can be provided by a screen locking manner in the prior art, for example, a conventional lock and unlock function is used to provide protection against a misoperation and security protection such as a cipher lock; a prompting function for basic information is used to prompt a user with incoming-call information and SMS message information; and an entry to a common setting and a common function is used for a user to rapidly set brightness and a data service switch or quick entry to some applications such as photographing. In general, a screen locking manner in the prior art is static. After a user sets a lock screen background, an unlock manner and an application entry, basically, a lock screen desktop may not change except indicating an SMS message or a call. Particularly, a background of the lock screen desktop is mechanical, lacks freshness, and cannot automatically switch.

SUMMARY

Embodiments of the present invention provide a screen locking method and a mobile terminal, to resolve a problem that a background of a lock screen desktop is mechanical, lacks freshness, and cannot automatically switch.

A first aspect of the embodiments of the present invention provides a screen locking method, including:
receiving an instruction, of a user, for lighting up a screen of a mobile terminal, and lighting up the screen of the mobile terminal; and
in a lock screen state, invoking a first picture from local pictures stored in the mobile terminal to replace a preset lock screen background, where the first picture is obtained by a user by means of downloading or photographing, or pushed by a server to the mobile terminal according to a preference of a user.

In a first possible implementation manner of the first aspect, the method further includes:
receiving an acquiring instruction generated when the user executes a preset gesture operation, acquiring content introduction information of the first picture, and displaying the content introduction information on a lock screen configuration interface.

With reference to the first possible implementation manner of the first aspect, in a second possible implementation manner, the method further includes:
receiving comment information that is of the first picture and is input by the user on the lock screen configuration interface, and uploading the comment information to the server, so that the server learns the preference of the user and pushes a picture that meets the preference of the user to the mobile terminal.

With reference to the first aspect or the first possible implementation manner of the first aspect, in a third possible implementation manner, the method further includes:
analyzing, by the mobile terminal, the preference of the user according to a search record and a browsing record that are of the user and in a mobile browser, and uploading an analysis result to the server, so that the server pushes a picture that meets the preference of the user to the mobile terminal; or
uploading, by the mobile terminal, a search record and a browsing record that are of the user and in a mobile browser to the server, so that the server analyzes the preference of the user and pushes a picture that meets the preference of the user to the mobile terminal.

With reference to the first aspect or with reference to the first, the second, or the third possible implementation manner of the first aspect, in a fourth possible implementation manner, the method further includes:
receiving a picture switching mode configuration instruction input by the user on the lock screen configuration interface, and enabling or disabling switching of a lock screen background; and
receiving a picture type setting instruction input by the user on the lock screen configuration interface, so that when the screen is lit up next time and switching of the lock screen background is enabled, a picture that meets a picture type set by the user is invoked as the lock screen background.

With reference to the first aspect or with reference to the first, the second, the third, or the fourth possible implementation manner of the first aspect, in a fifth possible implementation manner, the method further includes:
when the mobile terminal receives again, after the screen is turned off, the instruction, of the user, for lighting up the screen of the mobile terminal, lighting up the screen of the mobile terminal; and
in the lock screen state, invoking a second picture from the local pictures stored in the mobile terminal to replace the first picture as the lock screen background.

With reference to the fourth or the fifth possible implementation manner of the first aspect, in a sixth possible implementation manner, the method further includes:
when there is no picture that meets a preset picture type in the local pictures, randomly invoking a picture of another type in the local pictures to replace the preset lock screen background, or informing the user that there is no eligible picture; and
after all pictures that meet the preset picture type in the local pictures are switched, randomly invoking a picture of another type in the local pictures to replace the preset lock screen background, or informing the user that there is no new picture and pausing switching of the lock screen background until the user updates the local pictures.

With reference to the first, the second, or the fourth possible implementation manner of the first aspect, in a seventh possible implementation manner, the method further includes:

receiving an instruction, input by the user on the lock screen configuration interface, for displaying a next picture, acquiring a second picture and content introduction information of the second picture, replacing the first picture with the second picture as the lock screen background, and displaying the content introduction information of the second picture on the lock screen configuration interface; and/or receiving a picture sharing instruction input by the user on the lock screen configuration interface, acquiring a to-be-shared picture, and sharing the to-be-shared picture on another mobile terminal or a social network; and/or receiving a local-picture update setting instruction input by the user on the lock screen configuration interface, and specifying a network communication mode used when the mobile terminal receives the picture pushed by the server.

A second aspect of the embodiments of the present invention provides a mobile terminal, including:

a lighting-up unit, configured to: receive an instruction, of a user, for lighting up a screen of a mobile terminal, and light up the screen of the mobile terminal; and an invoking unit, configured to: in a lock screen state, invoke a first picture from local pictures stored in the mobile terminal to replace a preset lock screen background, where the first picture is obtained by a user by means of downloading or photographing, or pushed by a server to the mobile terminal according to a preference of a user.

In a first possible implementation manner of the second aspect, the mobile terminal further includes:

an acquiring unit, configured to: receive an acquiring instruction generated when the user executes a preset gesture operation, acquire content introduction information of the first picture, and display the content introduction information on a lock screen configuration interface.

With reference to the first possible implementation manner of the second aspect, in a second possible implementation manner, the mobile terminal further includes:

a configuring unit, configured to: receive comment information that is of the first picture and is input by the user on the lock screen configuration interface, and upload the comment information to the server, so that the server learns the preference of the user and pushes a picture that meets the preference of the user to the mobile terminal.

With reference to the second aspect or the first possible implementation manner of the second aspect, in a third possible implementation manner, the mobile terminal further includes:

an uploading unit, configured to: analyze the preference of the user according to a search record and a browsing record that are of the user and in a mobile browser, and upload an analysis result to the server, so that the server pushes a picture that meets the preference of the user to the mobile terminal; or configured to upload a search record and a browsing record that are of the user and in a mobile browser to the server, so that the server analyzes the preference of the user and pushes a picture that meets the preference of the user to the mobile terminal.

With reference to the second aspect or with reference to the first, the second, or the third possible implementation manner of the second aspect, in a fourth possible implementation manner, the configuring unit is further configured to:

receive a picture switching mode configuration instruction input by the user on the lock screen configuration interface, and enable or disable switching of a lock screen background; and receive a picture type setting instruction input by the user on the lock screen configuration interface, so that when the screen is lit up next time and switching of the lock screen background is enabled, a picture that meets a picture type set by the user is invoked as the lock screen background.

With reference to the second aspect or with reference to the first, the second, the third, or the fourth possible implementation manner of the second aspect, in a fifth possible implementation manner, the lighting-up unit is further configured to: when the mobile terminal receives again, after the screen is turned off, the instruction, of the user, for lighting up the screen of the mobile terminal, light up the screen of the mobile terminal; and the invoking unit is further configured to: in the lock screen state, invoke a second picture from the local pictures stored in the mobile terminal to replace the first picture as the lock screen background.

With reference to the fourth or the fifth possible implementation manner of the second aspect, in a sixth possible implementation manner, the invoking unit is further configured to:

when there is no picture that meets a picture type preset by the user in the local pictures, randomly invoke a picture of another type in the local pictures to replace the preset lock screen background, or inform the user that there is no eligible picture; and after all pictures that meet the picture type preset by the user in the local pictures are switched, randomly invoke a picture of another type in the local pictures to replace the preset lock screen background, or inform the user that there is no new picture and pause switching of the lock screen background until the user updates the local pictures.

With reference to the first, the second, or the fourth possible implementation manner of the second aspect, in a seventh possible implementation manner, the configuring unit is further configured to:

receive an instruction, input by the user on the lock screen configuration interface, for displaying a next picture, acquire a second picture and content introduction information of the second picture, replace the first picture with the second picture as the lock screen background, and display the content introduction information of the second picture on the lock screen configuration interface; and/or receive a picture sharing instruction input by the user on the lock screen configuration interface, acquire a to-be-shared picture, and share the to-be-shared picture on another mobile terminal or a social network; and/or receive a local-picture update setting instruction input by the user on the lock screen configuration interface, and specify a network communication mode used when the mobile terminal receives the picture pushed by the server.

A third aspect of the embodiments of the present invention provides a mobile terminal, including:

an input device, an output device, a memory, and a processor, where the input device, the output device, the memory, and the processor are connected to a bus, the memory stores a set of program code, and the processor is configured to invoke the program code stored in the memory and execute the following operations:

receiving an instruction, of a user, for lighting up a screen of the mobile terminal, and lighting up the screen of the mobile terminal; and in a lock screen state, invoking a first picture from local pictures stored in the mobile terminal to replace a preset lock screen background, where the first picture is obtained by a user by means of downloading or photographing, or pushed by a server to the mobile terminal according to a preference of a user.

In a first possible implementation manner of the third aspect, the processor is further configured to execute the following operations:

receiving an acquiring instruction generated when the user executes a preset gesture operation, acquiring content introduction information of the first picture, and displaying the content introduction information on a lock screen configuration interface.

With reference to the first possible implementation manner of the third aspect, in a second possible implementation manner, the mobile terminal further includes a transmitter; the processor is further configured to execute the following operations:

receiving comment information that is of the first picture and is input by the user on the lock screen configuration interface, and uploading the comment information to the server by using the transmitter, so that the server learns the preference of the user and pushes a picture that meets the preference of the user to the mobile terminal.

With reference to the third aspect or the first possible implementation manner of the third aspect, in a third possible implementation manner, the mobile terminal further includes a transmitter; the processor is further configured to execute the following operations:

analyzing the preference of the user according to a search record and a browsing record that are of the user and in a mobile browser, and uploading an analysis result to the server by using the transmitter, so that the server pushes a picture that meets the preference of the user to the mobile terminal; or uploading a search record and a browsing record that are of the user and in a mobile browser to the server by using the transmitter, so that the server analyzes the preference of the user and pushes a picture that meets the preference of the user to the mobile terminal.

With reference to the third aspect or with reference to the first, the second, or the third possible implementation manner of the third aspect, in a fourth possible implementation manner, the processor is further configured to execute the following operations:

receiving a picture switching mode configuration instruction input by the user on the lock screen configuration interface, and enabling or disabling switching of a lock screen background; and receiving a picture type setting instruction input by the user on the lock screen configuration interface, so that when the screen is lit up next time and switching of the lock screen background is enabled, a picture that meets a picture type set by the user is invoked as the lock screen background.

With reference to the third aspect or with reference to the first, the second, the third, or the fourth possible implementation manner of the third aspect, in a fifth possible implementation manner, the processor is further configured to execute the following operations:

when the mobile terminal receives again, after the screen is turned off, the instruction, of the user, for lighting up the screen of the mobile terminal, lighting up the screen of the mobile terminal; and in the lock screen state, invoking a second picture from the local pictures stored in the mobile terminal to replace the first picture as the lock screen background.

With reference to the fourth or the fifth possible implementation manner of the third aspect, in a sixth possible implementation manner, the processor is further configured to execute the following operations:

when there is no picture that meets a picture type preset by the user in the local pictures, randomly invoking a picture of another type in the local pictures to replace the preset lock screen background, or informing the user that there is no eligible picture; and after all pictures that meet the picture type preset by the user in the local pictures are switched, randomly invoking a picture of another type in the local pictures to replace the preset lock screen background, or informing the user that there is no new picture and pausing switching of the lock screen background until the user updates the local pictures.

With reference to the first, the second, or the fourth possible implementation manner of the third aspect, in a seventh possible implementation manner, the processor is further configured to execute the following operations:

receiving an instruction, input by the user on the lock screen configuration interface, for displaying a next picture, acquiring a second picture and content introduction info/nation about the second picture, replacing the first picture with the second picture as the lock screen background, and displaying the content introduction information of the second picture on the lock screen configuration interface; and/or receiving a picture sharing instruction input by the user on the lock screen configuration interface, acquiring a to-be-shared picture, and sharing the to-be-shared picture on another mobile terminal or a social network; and/or receiving a local-picture update setting instruction input by the user on the lock screen configuration interface, and specifying a network communication mode used when the mobile terminal receives the picture pushed by the server.

Implementation of the embodiments of the present invention has the following beneficial effects:

a screen of a mobile terminal is lit up, and a local picture is invoked to replace a preset lock screen background when the mobile terminal is in a lock screen state, so that a lock screen background automatically switches in the lock screen state, and a user can see a new lock screen background provided that the screen is lit up, thereby increasing variability of a lock screen background, improving switching efficiency, and enhancing a feeling of freshness of a user on a lock screen.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
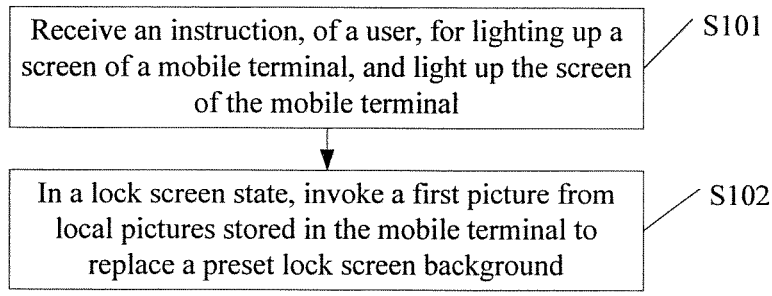
FIG. 1 is a schematic flowchart of a first embodiment of a screen locking method according to the present invention.

Referring to FIG. 1, FIG. 1 is a schematic flowchart of a first embodiment of a screen locking method according to the present invention. In this embodiment, the method includes the following steps:

S101: Receive an instruction, of a user, for lighting up a screen of a mobile terminal, and light up the screen of the mobile terminal.

S102: In a lock screen state, invoke a first picture from local pictures stored in the mobile terminal to replace a preset lock screen background.

The first picture may be obtained by the user by means of active downloading or photographing, or may be pushed by a server to the mobile terminal according to a preference of the user.

For example, if the user likes traveling, the user may actively download some scenery photos of a tourist attraction or save a photo photographed during traveling on the mobile terminal, to be used as a candidate picture of a lock screen background. The user may also comment on an existing lock screen background, so that the server learns the preference of the user, and the server pushes a scenery-type picture.

Optionally, in an implementation manner of this embodiment of the present invention, the first picture may be an electronic magazine in a form of picture. The mobile terminal may invoke a locally stored electronic magazine to replace the preset lock screen background, where the electronic magazine is presented in a form of picture. The electronic magazine may be downloaded by the user, may be made by the user by using local software of the mobile terminal, or may be pushed by the server, for example, an application store regularly pushes an electronic magazine to a terminal, so as to recommend and introduce related information of the application store or a vendor of the terminal. The electronic magazine has both a feature of a plane and a feature of the Internet, and can embrace mutual dynamic combination of a picture, a text, a sound, a video, a game, and the like. After the user lights up the screen, in the lock screen state, the mobile terminal invokes a lock screen magazine to replace the preset lock screen background, which may specifically be the following one or several cases: presenting a cover picture or a content picture of the electronic magazine; playing background music of the electronic magazine; playing a preset video of the electronic magazine; presenting a game interface entry in the electronic magazine; and so on. Further, the electronic magazine may further include a network element such as a hyperlink and a instant interaction, which ensures that a user can participate in an interaction in addition to learning content of the magazine, thereby improving user experience. In this embodiment of the present invention, a format of the electronic magazine is not limited, and may be an ie format, an im format, an flv format, and the like. A travel topic is still used as an example. If a currently stored electronic magazine is a travel-type electronic magazine whose format is the flv format, when the user lights up the mobile terminal, the user generally presses a power button of the mobile terminal. In this case, the mobile terminal receives the instruction, of the user, for lighting up the screen; therefore, in the lock screen state, a scenery picture is invoked from a travel-type electronic magazine stored in the mobile terminal to replace the preset lock screen background. When the picture is invoked from the travel-type electronic magazine, invoking may be performed according to pages of the electronic magazine in order or in reverse order, or invoking may be performed randomly, which is not limited herein. Certainly, content introduction information such as text content, video content, or music content related to the scenery picture may also be shown on a lock screen interface. Certainly, an additional display interface may also be configured to display the content. For example, on the lock screen interface, the user may flick upward to trigger the mobile terminal to switch to another display interface to show the text content, video content, or music content. Therefore, when the user uses the electronic magazine as a lock screen background, in a case in which no misoperation is caused, the user may acquire information from the lock screen interface in a multi-dimensional manner (including an image, a text, a sound, a video, and an interaction), thereby improving user experience.

In this embodiment, a format of a picture that is invoked for replacing the preset background is not limited, and a jpg format, a bmp format, a png format, a gif format, and the like may all be invoked. A picture in the gif format may be directly invoked as a dynamic lock screen background, or after a picture in the gif format is invoked, a frame of image of the invoked picture may be captured as a static lock screen background, which is not limited in the present invention either.

It should be noted that, in the foregoing, a scenery-type picture is used as an example for description, but a type of the picture may include but is not limited to a scenery-type picture, a person-type picture, an animal-type picture, an automobile-type picture, a science/technology-type picture, a sports-type picture, and a military-type picture. Specifically, pictures may be stored in different folders, and each type of picture may further be classified into some subtypes, for example, a sports type may be classified into a basketball subtype, a football subtype, and the like.

A screen of a mobile terminal is lit up, and a local picture is invoked to replace a preset lock screen background when the mobile terminal is in a lock screen state, so that automatic switching of a lock screen background in the lock screen state is implemented, and a user can see a new lock screen background provided that the screen is lit up, thereby increasing variability of a lock screen background, improving switching efficiency, and enhancing a feeling of freshness of a user on a lock screen.

Figure 2:
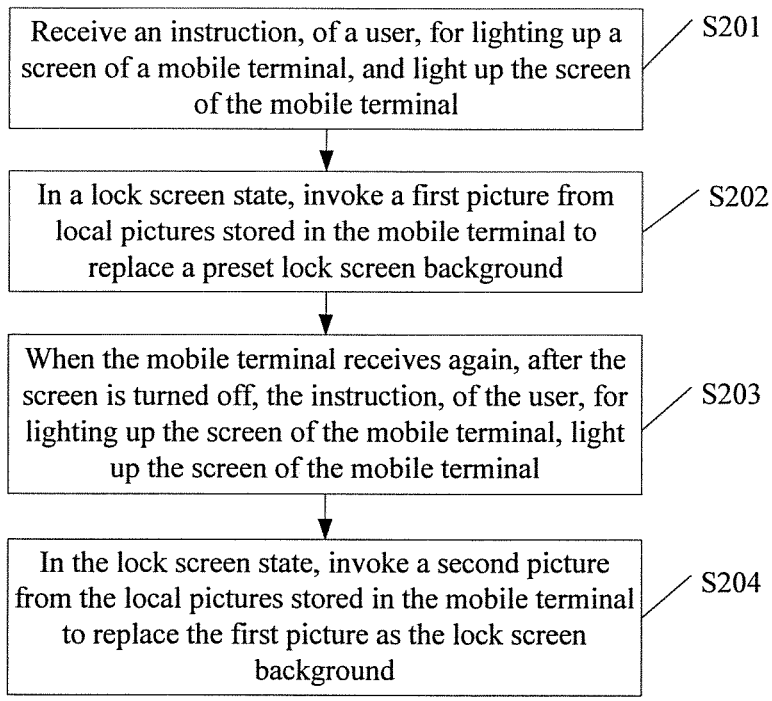
FIG. 2 is a schematic flowchart of a second embodiment of a screen locking method according to the present invention.

After the screen of the mobile terminal is turned off, the user needs to light up the screen of the mobile terminal again. Referring to FIG. 2, FIG. 2 is a schematic flowchart of a second embodiment of a screen locking method according to the present invention. In this embodiment, steps S201 to S202 are the same as steps S101 to S102 in the first embodiment of a screen locking method according to the present invention, which are not described herein again.

S203: When the mobile terminal receives again, after the screen is turned off, the instruction, of the user, for lighting up the screen of the mobile terminal, light up the screen of the mobile terminal.

S204: In the lock screen state, invoke a second picture from the local pictures stored in the mobile terminal to replace the first picture as a lock screen background.

In this way, each time when the user lights up the screen, the mobile terminal automatically switches the lock screen background once, so that the lock screen background becomes diversified, thereby improving user experience.

Figure 3:
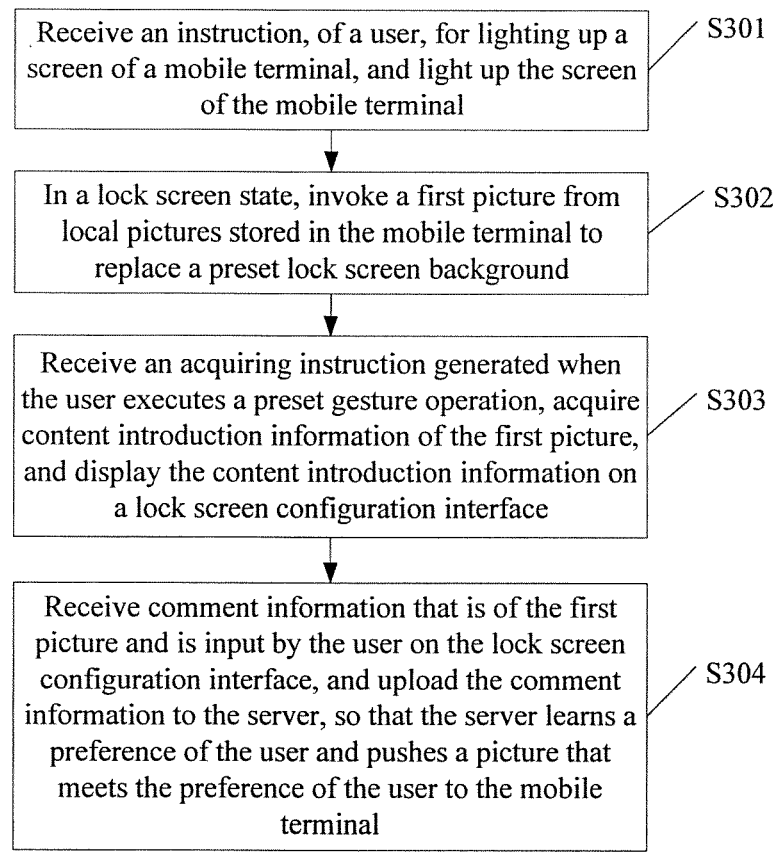
FIG. 3 is a schematic flowchart of a third embodiment of a screen locking method according to the present invention.

Optionally, a picture on the mobile terminal may be downloaded by the user, or may be pushed by the server. When the server pushes a picture, to reduce storage pressure of the mobile terminal, a picture liked by the user needs to be pushed according to a preference of the user. Therefore, the server has to learn the preference of the user. A manner for acquiring the preference of the user may be as follows: first configuring a lock screen configuration interface for the mobile terminal, where the lock screen configuration interface is used to configure various functions of a lock screen, for example, the functions may include but are not limited to enabling and disabling of the lock screen, commenting on a current lock screen background, and the like. To enable the user to learn a picture better, content introduction information of the picture may further be displayed on the lock screen configuration interface. Specifically, referring to FIG. 3, FIG. 3 is a schematic flowchart of a third embodiment of a screen locking method according to the present invention. In this embodiment, steps S301 to S302 are the same as steps S101 to S102, which are not described herein again.

S303: Receive an acquiring instruction generated when the user executes a preset gesture operation, acquire content introduction information of the first picture, and display the content introduction information on a lock screen configuration interface.

Optionally, the preset gesture operation may be an upward flick and a downward flick on the screen of the mobile terminal, touching and holding a screen, or double-tapping a screen, provided that the preset gesture operation does not conflict with a gesture operation of another function. In this embodiment, a gesture operation of an upward flick is used as an example for description.

The content introduction information of the first picture may be an explanation or a description of picture content. For example, for a scenery-type picture, a site in which scenery is located and a scenery feature may be described; for a picture of a sports star in a sports-type picture, brilliant achievements of the sports star may be introduced and described; and so on. Even a network connection address may further be attached to the content introduction information, so that a user who is interested in the content introduction information taps the address to learn more details.

S304: Receive comment information that is of the first picture and is input by the user on the lock screen configuration interface, and upload the comment information to the server, so that the server learns a preference of the user and pushes a picture that meets the preference of the user to the mobile terminal.

On the lock screen configuration interface, a "favorite" option may be set. The user only needs to tap the option to comment on a current lock screen background. The comment information is uploaded to the server, and the server may learn the preference of the user, so that a picture liked by the user is pushed as the lock screen background when a photo is pushed.

Certainly, when learning the preference of the user, the mobile terminal may further analyze the preference of the user according to a search record and a browsing record that are of the user and in a mobile browser, and upload an analysis result to the server, so that the server pushes the picture that meets the preference of the user to the mobile terminal; or the mobile terminal uploads a search record and a browsing record that are of the user and in a mobile browser to the server, so that the server analyzes the preference of the user and pushes the picture that meets the preference of the user to the mobile terminal.

The user may only stay on the lock screen interface and not necessarily switch to the lock screen configuration interface to comment on the current lock screen background, and therefore, the mobile terminal may further analyze the preference of the user according to the search record and the browsing record that are of the user and in the mobile browser. If the user often searches for or browses a website about an automobile, an automobile-type picture may be pushed to the user; and when the user often searches for or browses a website about a mobile phone or a computer, a science/technology-type picture may be pushed to the user.

It should be noted that, when the two manners for learning the preference of the user are performed at the same time, the server may give priority to comment information of the user; certainly, the server may also give priority to an analysis result obtained according to a search record and a browsing record; or the server may further allocate different weights to results that are obtained in the two manners, and acquire a most accurate preference of the user by means of weighted calculation.

Specifically, when the server pushes a picture, the picture may be pushed in a form of theme or electronic magazine, where the theme may include a lock screen background and display icons of various functions, and the electronic magazine may include a picture, music, a video, and even a hyperlink, and the like. Certainly, the server may also push a picture only in a form of picture, and only a picture used as the lock screen background is included.

In this embodiment, a screen of a mobile terminal is lit up, and a picture is invoked to replace a preset lock screen background, thereby increasing variability of a lock screen background, and enhancing a feeling of freshness of a user on a lock screen; a picture content introduction after a lock screen background is switched may be viewed by means of a preset gesture operation, thereby enriching content of the lock screen; and an entry to picture commenting is provided, which helps a server learn a preference of the user, so that a picture that meets the preference of the user is pushed to the user as a lock screen background, thereby improving user experience.

Figure 4:
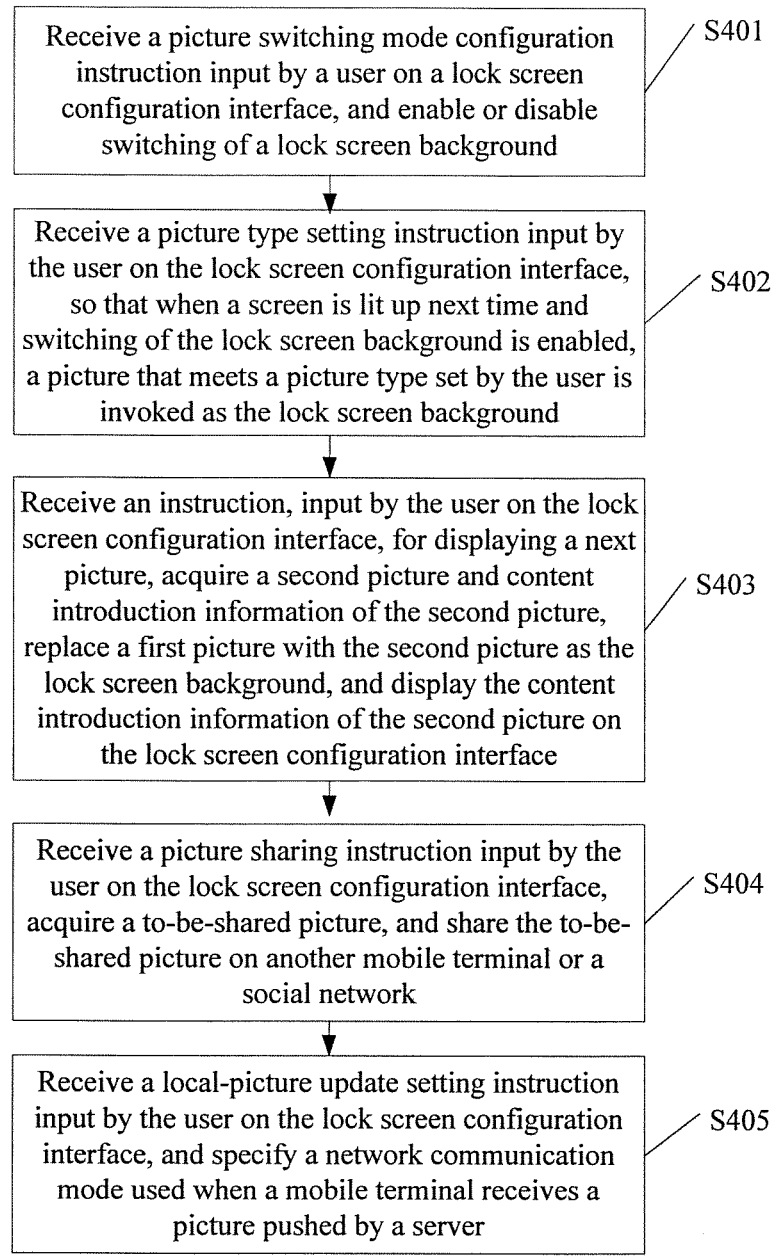
FIG. 4 is a schematic flowchart of a fourth embodiment of a screen locking method according to the present invention.

Optionally, another function option may also be configured on the lock screen configuration interface, so that the user performs further configuration for the lock screen, such as an on and off option for switching a lock screen, an option for setting a picture switching type, an option for viewing a next picture, and an option for sharing a current lock screen background. Referring to FIG. 4, FIG. 4 is a schematic flowchart of a fourth embodiment of a lock screen method according to the present invention.

When these function options exist, the mobile terminal may further:

S401: Receive a picture switching mode configuration instruction input by a user on the lock screen configuration interface, and enable or disable switching of a lock screen background. If the user chooses to disable switching of the lock screen background, the lock screen background keeps unchanged each time a screen is lit up.

S402: Receive a picture type setting instruction input by the user on the lock screen configuration interface, and when the screen is lit up next time, invoke a picture that meets a picture type set by the user. If the user currently selects a scenery-type picture, but the Olympic Games have been held recently and the user expects to acquire more information related to sports, the user may choose to set a picture type as a sports-type picture.

S403: Receive an instruction, input by the user on the lock screen configuration interface, for displaying a next picture, acquire a second picture and content introduction information of the second picture, replace the first picture with the second picture as the lock screen background, and display the content introduction information of the second picture on the lock screen configuration interface. When the user likes the sports-type picture but is not interested in sports content displayed in the first picture, the user may actively perform switching. When the lock screen background is switched to a last picture, switching may be stopped or continuing switching to the first picture.

S404: Receive a picture sharing instruction input by the user on the lock screen configuration interface, acquire a to-be-shared picture, and share the to-be-shared picture on another mobile terminal or a social network. When the user feels that the current lock screen background may also be liked by another friend, the user may tap a share option, so that the another friend acquires a picture corresponding to the lock screen background.

S405: Receive a local-picture update setting instruction input by the user on the lock screen configuration interface, and specify a network communication mode used when the mobile terminal receives a picture pushed by the server. For example, the user may choose to perform local-picture updating in a network communication mode of 2G, 3G, or Wireless Fidelity (Wireless Fidelity, Wi-Fi for short), or may choose to perform local-picture updating only in a network communication mode of Wi-Fi to reduce a traffic tariff.

Because storage space of the mobile terminal is limited, space used to store local pictures is also limited. When there is no picture that meets a picture type preset by the user in the local pictures, a picture of another type may be randomly invoked from the local pictures to replace a preset lock screen background, or the user is informed that there is no eligible picture.

After all pictures that meet the picture type preset by the user in the local pictures are switched, a picture of another type in the local pictures may be randomly invoked to replace the preset lock screen background, or the user is informed that there is no new picture and switching of the lock screen background is paused until the user updates the local pictures.

Certainly, if the user does not set a picture type, the mobile terminal may select a picture pushed by the server according to a preference of the user, to perform switching; and after all pictures are switched, the user may be informed that there is no new picture and switching of the lock screen background is paused until the user updates the local pictures.

It should be noted that, in this embodiment, some functions of the lock screen configuration interface are described, and the mobile terminal may separately receive different instructions input by the user, so as to perform different processing to implement various functions. Therefore, for steps S401 to S405, there are no strict logical relationships or time sequences. For example, the user may choose to disable switching of a lock screen, but may still set a picture type, so that a picture of the type set by the user is invoked when switching of the lock screen is enabled next time.

Figure 5:
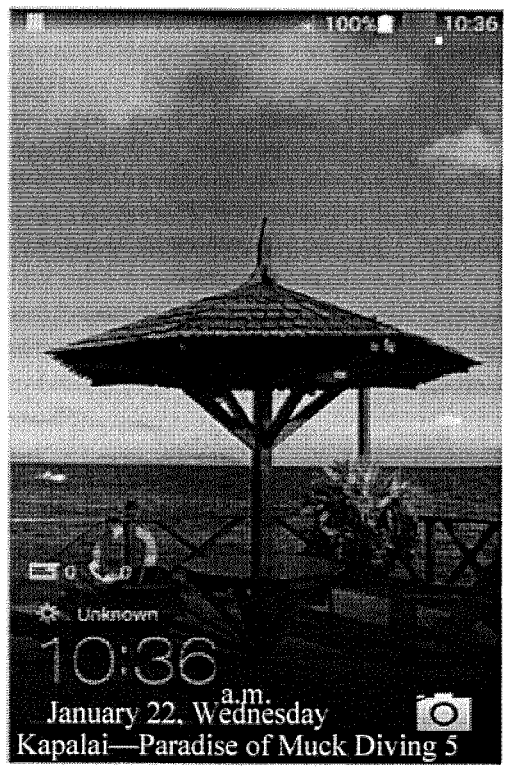
FIG. 5 is a schematic diagram of a lock screen interface when a screen locking method according to the present invention is used.
Figure 6:
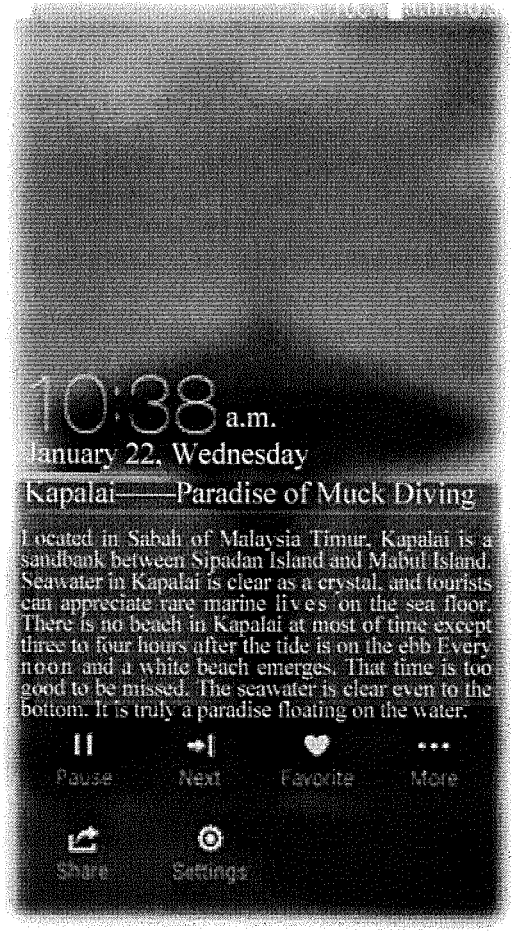
FIG. 6 is a schematic diagram of a lock screen configuration interface corresponding to the lock screen interface in FIG. 5.

For detailed introductions to a lock screen interface and a lock screen configuration interface, reference may be made to FIG. 5 and FIG. 6. FIG. 5 is a schematic diagram of a lock screen interface when a lock screen method according to the present invention is used, and FIG. 6 is a schematic diagram of a lock screen configuration interface corresponding to the lock screen interface in FIG. 5.

In FIG. 5, the lock screen interface includes conventional items such as a date, time, signal strength, a battery level, an SMS message, call information, and a quick entry to a photographing application, and a lock screen background and a name of the lock screen background. A picture used as the lock screen background may come from an electronic magazine, and the name of the lock screen background may further be displayed on the lock screen interface. When a user likes the lock screen background and tries to acquire content introduction information of the picture of the lock screen background, the user may flick upward on the lock screen interface, so that a mobile terminal may invoke, from the electronic magazine, the content introduction information of the picture that is used as the lock screen background, and enter the lock screen configuration interface shown in FIG. 6. On the lock screen configuration interface, content introduction information of a picture and various function options may be included, for example, Pause (pause), Next (next), Favorite (favorite), Share (share), Setting (setting), a first function option represented by a heart-shaped icon, and More (more). The "Pause" option may be used to set enabling and disabling of switching of the lock screen background, the "Next" option may be used to view a next picture, the "Favorite" option may be used to comment on a current lock screen background, the "Share" option may be used to share a current lock screen background on another mobile terminal or a social network, the "Setting" option may be used to set a picture type for switching, restriction on a network communication mode used when local pictures are updated, and so on, and the "More" option may be reserved to add a new function option subsequently.

Figure 7:
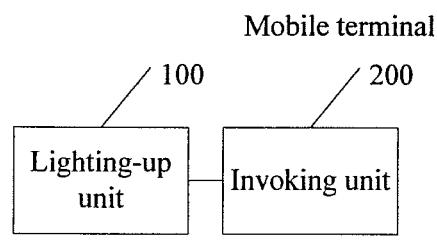
FIG. 7 is a schematic structural diagram of a first embodiment of a mobile terminal according to the present invention.

Referring to FIG. 7, FIG. 7 is a schematic structural diagram of a first embodiment of a mobile terminal according to the present invention. In this embodiment, the mobile terminal includes:

a lighting-up unit 100, configured to receive an instruction, of a user, for lighting up a screen of the mobile terminal, and light up the screen of the mobile terminal; and an invoking unit 200, configured to: in a lock screen state, invoke a first picture from local pictures stored in the mobile terminal to replace a preset lock screen background, where the first picture is obtained by a user by means of downloading or photographing, or pushed by a server to the mobile terminal according to a preference of a user.

Figure 8:
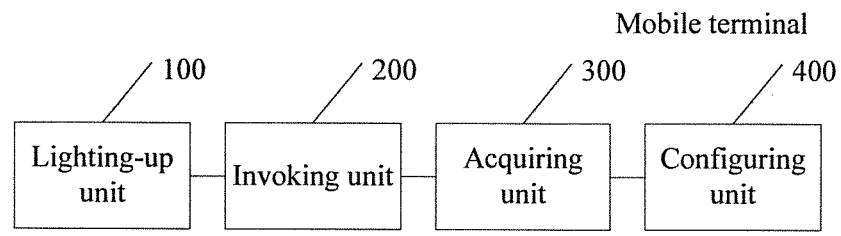
FIG. 8 is a schematic structural diagram of a second embodiment of a mobile terminal according to the present invention.

Referring to FIG. 8, in a second embodiment of the mobile terminal according to the present invention, the mobile terminal may further include:

an acquiring unit 300, configured to: receive an acquiring instruction generated when the user executes a preset gesture operation, acquire content introduction information of the first picture, and display the content introduction information on a lock screen configuration interface; and a configuring unit 400, configured to: receive comment information that is of the first picture and is input by the user on the lock screen configuration interface, and upload the comment information to the server, so that the server learns the preference of the user and pushes a picture that meets the preference of the user to the mobile terminal.

The picture type may include but is not limited to a scenery-type picture, a person-type picture, an animal-type picture, an automobile-type picture, a science/technology-type picture, a sports-type picture, and a military-type picture.

Figure 9:
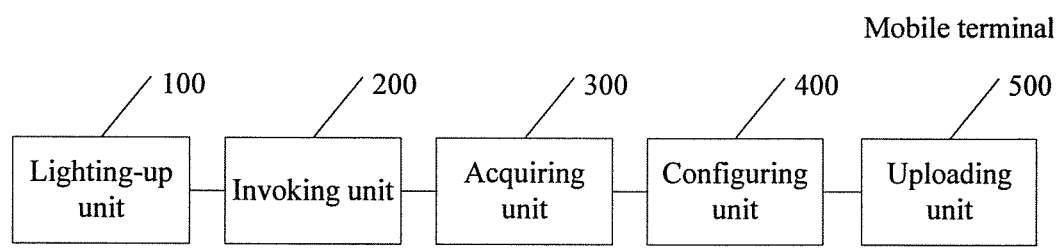
FIG. 9 is a schematic structural diagram of a third embodiment of a mobile terminal according to the present invention.

Optionally, referring to FIG. 9, in the second embodiment of the mobile terminal according to the present invention, the mobile terminal may further include an uploading unit 500, configured to: analyze the preference of the user according to a search record and a browsing record that are of the user and in a mobile browser, and upload an analysis result to the server, so that the server pushes the picture that meets the preference of the user to the mobile terminal; or configured to upload a search record and a browsing record that are of the user and in a mobile browser to the server, so that the server analyzes the preference of the user and pushes the picture that meets the preference of the user to the mobile terminal.

Optionally, the configuring unit 400 is further configured to:

receive a picture switching mode configuration instruction input by the user on the lock screen configuration interface, and enable or disable switching of a lock screen background; and receive a picture type setting instruction input by the user on the lock screen configuration interface, and when the screen is lit up next time, invoke a picture that meets a picture type set by the user.

The configuring unit 400 is further configured to:

receive an instruction, input by the user on the lock screen configuration interface, for displaying a next picture, acquire a second picture and content introduction information of the second picture, replace the first picture with the second picture as the lock screen background, and display the content introduction information of the second picture on the lock screen configuration interface; and/or receive a picture sharing instruction input by the user on the lock screen configuration interface, acquire a to-be-shared picture, and share the to-be-shared picture on another mobile terminal or a social network; and/or receive a local-picture update setting instruction input by the user on the lock screen configuration interface, and restrict a network communication mode used when the mobile terminal receives the picture pushed by the server.

The lighting-up unit 100 is further configured to: when the mobile terminal receives again, after the screen is turned off, the instruction, of the user, for lighting up the screen of the mobile terminal, light up the screen of the mobile terminal; and the invoking unit 200 is further configured to: in the lock screen state, invoke a second picture from the local pictures stored in the mobile terminal to replace the first picture as the lock screen background.

The invoking unit 200 is further configured to:

when there is no picture that meets a picture type preset by the user in the local pictures, randomly invoke a picture of another type in the local pictures to replace the preset lock screen background, or inform the user that there is no eligible picture; and after all pictures that meet the picture type preset by the user in the local pictures are switched, randomly invoke a picture of another type in the local pictures to replace the preset lock screen background, or inform the user that there is no new picture and pause switching of the lock screen background until the user updates the local pictures.

It should be noted that, the lighting-up unit 100, the invoking unit 200, the acquiring unit 300, the configuring unit 400, and the uploading unit 500 may exist independently, or may be disposed integrally. The lighting-up unit 100, the invoking unit 200, the acquiring unit 300, the configuring unit, or the uploading unit 500 in the foregoing mobile terminal embodiments may be independent of a processor of the mobile terminal and be disposed alone in a form of hardware, and a disposing form may be a form of microprocessor; or the foregoing units may be embedded in a processor of the mobile terminal in a form of hardware, or may further be stored in a memory of the mobile terminal in a form of software, so that the processor of the mobile terminal invokes the lighting-up unit 100, the invoking unit 200, the acquiring unit 300, the configuring unit, or the uploading unit 500 to execute corresponding operations.

For example, in the second embodiment (the embodiment shown in FIG. 8) of the mobile terminal according to the present invention, the invoking unit 200 may be a processor of the mobile terminal, and functions of the lighting-up unit 100, the acquiring unit 300, and the configuring unit 400 may be embedded in the processor, may be independent of the processor and be disposed alone, or may be stored in a memory in a form of software. The processor invokes and implements the functions of the foregoing units. Certainly, the lighting-up unit 100, the invoking unit 200, the acquiring unit 300, and the configuring unit 400 may be disposed integrally, may also be set independently, or may further be used as an interface circuit of the mobile terminal and disposed independently or integrally. This embodiment of the present invention imposes no limitation thereto. The processor may be a central processing unit (CPU), a microprocessor, a single-chip microcomputer, or the like.

Figure 10:
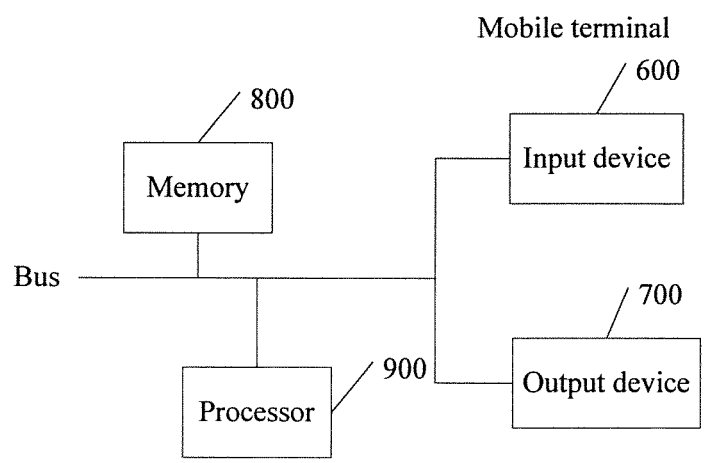
FIG. 10 is a schematic structural diagram of a fourth embodiment of a mobile terminal according to the present invention.

Referring to FIG. 10, FIG. 10 is a schematic structural diagram of a fourth embodiment of a mobile terminal according to the present invention. In this embodiment, the mobile terminal includes:

an input device 600, an output device 700, a memory 800, and a processor 900, where the input device 600, the output device 700, the memory 800, and the processor 900 are connected to a bus, the memory 800 is configured to store a set of program code, and the processor 900 is configured to invoke the program code stored in the memory 600 and execute the following operations:

receiving an instruction, of a user, for lighting up a screen of the mobile terminal, and lighting up the screen of the mobile terminal; and in a lock screen state, invoking a first picture from local pictures stored in the mobile terminal to replace a preset lock screen background, where the first picture is obtained by a user by means of downloading or photographing, or pushed by a server to the mobile terminal according to a preference of a user.

The picture type includes a scenery-type picture, a person-type picture, an animal-type picture, an automobile-type picture, a science/technology-type picture, a sports-type picture, and a military-type picture.

The processor 900 is further configured to execute the following operations:

receiving an acquiring instruction generated when the user executes a preset gesture operation, acquiring content introduction information of the first picture, and displaying the content introduction information on a lock screen configuration interface.

The mobile terminal further includes a transmitter, and the processor 900 is further configured to execute the following operations:

receiving comment information that is of the first picture and is input by the user on the lock screen configuration interface, and uploading the comment information to the server by using the transmitter, so that the server learns the preference of the user and pushes a picture that meets the preference of the user to the mobile terminal.

The mobile terminal further includes a transmitter, and the processor 900 is further configured to execute the following operations:

analyzing the preference of the user according to a search record and a browsing record that are of the user and in a mobile browser, and uploading an analysis result to the server by using the transmitter, so that the server pushes a picture that meets the preference of the user to the mobile terminal; or uploading a search record and a browsing record that are of the user and in a mobile browser to the server by using the transmitter, so that the server analyzes the preference of the user and pushes a picture that meets the preference of the user to the mobile terminal.

The processor 900 is further configured to execute the following operations:

receiving a picture switching mode configuration instruction input by the user on the lock screen configuration interface, and enabling or disabling switching of a lock screen background; and receiving a picture type setting instruction input by the user on the lock screen configuration interface, and when the screen is lit up next time, invoking a picture that meets a picture type set by the user.

The processor 900 is further configured to execute the following operations:

when the mobile terminal receives again, after the screen is turned off, the instruction, of the user, for lighting up the screen of the mobile terminal, lighting up the screen of the mobile terminal; and in the lock screen state, invoking a second picture from the local pictures stored in the mobile terminal to replace the first picture as the lock screen background.

The processor 900 is further configured to execute the following operations:

when there is no picture that meets a picture type preset by the user in the local pictures, randomly invoking a picture of another type in the local pictures to replace the preset lock screen background, or informing the user that there is no eligible picture; and after all pictures that meet the picture type preset by the user in the local pictures are switched, randomly invoking a picture of another type in the local pictures to replace the preset lock screen background, or informing the user that there is no new picture and pausing switching of the lock screen background until the user updates the local pictures.

The processor 900 is further configured to execute the following operations:

receiving an instruction, input by the user on the lock screen configuration interface, for displaying a next picture, acquiring a second picture and content introduction information of the second picture, replacing the first picture with the second picture as the lock screen background, and displaying the content introduction information of the second picture on the lock screen configuration interface; and/or receiving a picture sharing instruction input by the user on the lock screen configuration interface, acquiring a to-be-shared picture, and sharing the to-be-shared picture on another mobile terminal or a social network; and/or receiving a local-picture update setting instruction input by the user on the lock screen configuration interface, and restricting a network communication mode used when the mobile terminal receives the picture pushed by the server.

It should be noted that, the embodiments in this specification are described in a progressive manner, with each embodiment emphasizing differences between the embodiment and other embodiments, and for same or similar parts, reference may be made among the embodiments. The apparatus embodiments are basically the same as the method embodiments, and are therefore described relatively briefly. For related parts, reference may be made to the part of description in the method embodiments.

As described in the foregoing embodiments, the present invention has the following advantages:

a screen of a mobile terminal is lit up, and a local picture is invoked to replace a preset lock screen background when the mobile terminal is in a lock screen state, so that automatic switching of a lock screen background in the lock screen state is implemented, and a user can see a new lock screen background provided that the screen is lit up, thereby increasing variability of a lock screen background, improving switching efficiency, and enhancing a feeling of freshness of a user on a lock screen.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing describes in detail a lock screen method and a mobile terminal that are provided in the embodiments of the present invention. Specific examples are used in this specification to describe the principles and implementation manners of the present invention, and the description of the foregoing embodiments is merely used to help the understanding of the methods and core ideas of the present invention; in addition, a person of ordinary skill in the art can make modifications and variations to the specific implementation manners and application scopes according to the ideas of the present invention. In summary, the content of the specification shall not be construed as limitations on the present invention.

What is claimed is:

1. A method, comprising:
   in response to lighting up a touch screen of a terminal, displaying a first lock screen interface on the touch screen of the terminal with the terminal being in a lock screen state without displaying a first lock screen configuration interface simultaneously, wherein the first lock screen interface shows a first picture as a lock screen background image, and wherein the first lock screen interface does not comprise a first text introduction of the lock screen background image or a first function option for commenting on the lock screen background image;
   receiving, while displaying the first lock screen interface without displaying the first lock screen configuration interface, a first touch input on the first lock screen interface;
   after displaying the first lock screen interface without displaying the first lock screen configuration interface and in response to receiving the first touch input on the first lock screen interface, continuing to display the first lock screen interface on the touch screen of the terminal and beginning to display the first lock screen configuration interface on the touch screen of the terminal with the terminal remaining in the lock screen state, wherein the first text introduction of the lock screen background image is displayed on the first lock screen configuration interface, wherein the first lock screen configuration interface simultaneously displays the first function option for commenting on the lock screen background image and a second function option for displaying a second picture as the lock screen background image, wherein the first function option is represented by a heart-shaped icon, wherein the second function option comprises text indicating that selection of the second function option changes the lock screen background image from the first picture to the second picture, and wherein at least a portion of the first picture is visible when the first lock screen configuration interface is displayed;
   in response to receiving a second touch input on the heart-shaped icon on the first lock screen configuration interface:
      identifying the first picture as a favorite;
      obtaining a search record and a browsing record of a user of the terminal;
      analyzing, by the terminal, the search record and the browsing record to obtain an analysis result;
      sending the analysis result and comment information of the first picture to a server, wherein the comment information is configured to instruct the server to send a third picture associated with the comment to the terminal when the server sends a next picture, and wherein the third picture is configured to be displayed on the touch screen of the terminal as the lock screen background image;
      receiving, based on the search record, the browsing record, the analysis result, and the comment information, the third picture from the server;
      lighting up the touch screen of the terminal after receiving the third picture from the server; and
      displaying the third picture on the touch screen of the terminal as the lock screen background image when the touch screen of the terminal is lit up; and
   in response to receiving a third touch input on the second function option on the first lock screen configuration interface for displaying the second picture as the lock screen background image:
      obtaining the second picture and a second text introduction of the second picture; and
      after obtaining the second picture and the second text introduction of the second picture, replacing the first picture with the second picture as the lock screen background image on the touch screen of the terminal and replacing the first text introduction with the second text introduction on the touch screen of the terminal.

2. The method of claim 1, wherein the third picture is provided based on the first picture being identified as the favorite, and wherein the first lock screen interface displays a current date and a current time.

3. The method of claim 1, further comprising disabling switching of the lock screen background image in response to receiving a fourth touch input on the first lock screen configuration interface, wherein the lock screen background image of the terminal remains unchanged after switching of the lock screen background image is disabled.

4. The method of claim 3, further comprising enabling switching of the lock screen background image in response to receiving a fifth touch input on the first lock screen configuration interface.

5. The method of claim 1, further comprising identifying a fourth picture from local pictures stored in the terminal to replace the first picture with the fourth picture as the lock screen background image in the lock screen state.

6. The method of claim 1, wherein the first lock screen configuration interface further comprises at least one of the following function options: an option for enabling and disabling a lock screen background image switching function, an option for sharing a lock screen picture on another terminal or a social network, an option for setting a picture type, or an option for specifying a network communication mode used when local pictures are updated.

7. The method of claim 1, wherein a lower right corner of the first lock screen interface comprises a quick entry to a photographing application, and wherein the terminal does not display the quick entry to the photographing application when the first lock screen configuration interface is displayed.

8. The method of claim 1, wherein the first lock screen configuration interface overlays the first lock screen interface, and wherein both the first lock screen interface and the first lock screen configuration interface display a current time and date.

9. The method of claim 1, wherein replacing the first picture with the second picture comprises automatically switching the first picture with the second picture after receiving the third touch input.

10. The method of claim 9, wherein the first picture and the second picture comprise scenery-type pictures.

11. The method of claim 9, wherein the first picture and the second picture comprise photographs.

12. The method of claim 9, wherein the comment information comprises a preference of the user.

13. The method of claim 1, further comprising sending the search record and the browsing record to the server to prompt the server to analyze the search record and the browsing record and to send, based on the search record, the browsing record, and the comment information, the third picture.

14. The method of claim 1, further comprising allocating different priority weights to the search record, the browsing record, and the comment information, and wherein receiving the third picture from the server comprises receiving, based on the different priority weights, the search record, the browsing record, and the comment information, the third picture from the server.

15. The method of claim 1, wherein the first lock screen configuration interface further comprises a sharing option, and wherein the sharing option is configured to receive a picture sharing instruction from the user and share the first picture with another terminal or with a social network.

16. The method of claim 1, wherein the first lock screen configuration interface further comprises a pause option, a next option, a share option, and a setting option, wherein the pause option is configured to set enabling and disabling of the lock screen background image, wherein the next option is configured to view the next picture, wherein the share option is configured to share the first picture with another terminal or with a social network, and wherein the setting option is configured to set a picture type for switching and a restriction on a network communication mode for updating pictures.

17. The method of claim 1, wherein receiving the third picture from the server comprises receiving the third picture and additional media from the server, wherein the additional media comprises at least one of music, a video, a game interface, or a hyperlink, and wherein displaying the third picture further comprises playing the music, playing the video, displaying the game interface, or displaying the hyperlink when the third picture is displayed.

18. A terminal, comprising:
one or more processors; and
an input device coupled to the one or more processors through a bus;
an output device coupled to the one or more processors through the bus; and
a memory coupled to the one or more processors through the bus, wherein the memory stores a set of program code that, when executed by the one or more processors, causes the terminal to:
in response to lighting up a touch screen of the terminal, display a first lock screen interface on the touch screen of the terminal with the terminal being in a lock screen state without displaying a first lock screen configuration interface simultaneously, wherein the first lock screen interface shows a first picture as a lock screen background image, and wherein the first lock screen interface does not comprise a first text introduction of the lock screen background image or a first function option for commenting on the lock screen background image;
receive, while displaying the first lock screen interface without displaying the first lock screen configuration interface, a first touch input on the first lock screen interface;
after displaying the first lock screen interface without displaying the first lock screen configuration interface and in response to receiving the first touch input on the first lock screen interface, continue to display the first lock screen interface on the touch screen of the terminal and begin to display the first lock screen configuration interface on the touch screen of the terminal with the terminal remaining in the lock screen state, wherein the first lock screen configuration interface simultaneously displays the first function option for commenting on the lock screen background image and a second function option for displaying a second picture as the lock screen background image, wherein the first text introduction of the lock screen background image is displayed on the first lock screen configuration interface, wherein the first function option is represented by a heart-shaped icon, wherein the second function option comprises text indicating that selection of the second function option changes the lock screen background image from the first picture to the second picture, and wherein at least a portion of the first picture is visible when the first lock screen configuration interface is displayed;
in response to receiving a second touch input on the heart-shaped icon on the first lock screen configuration interface:
identify the first picture as a favorite;
obtain a search record and a browsing record of a user of the terminal;
analyze, by the terminal, the search record and the browsing record to obtain an analysis result;
send the analysis result and comment information of the first picture to a server, wherein the comment information is configured to instruct the server to send a third picture associated with the comment to the terminal when the server sends a next picture, and wherein the third picture is configured to be displayed on the touch screen of the terminal as the lock screen background image;
receive, based on the search record, the browsing record, the analysis result, and the comment information, the third picture from the server;
light up the touch screen of the terminal after receiving the third picture from the server; and
display the third picture on the touch screen of the terminal as the lock screen background image when the touch screen of the terminal is lit up; and
in response to receiving a third touch input on the second function option on the first lock screen configuration interface for displaying the second picture as the lock screen background image:
obtain the second picture and a second text introduction of the second picture; and after obtaining the second picture and the second text introduction of the second picture, replace the first picture with the second picture as the lock screen background image on the touch screen of the terminal and replace the first text introduction with the second text introduction on the touch screen of the terminal.

19. The terminal of claim 18, wherein the third picture is provided based on the first picture being identified as the favorite, and wherein the first lock screen interface displays a current date and a current time.

20. The terminal of claim 19, wherein the set of program code, when executed by the one or more processors, causes the terminal to disable switching of the lock screen background image in response to receiving a fourth touch input on the first lock screen configuration interface, and wherein the lock screen background image of the terminal remains unchanged after switching of the lock screen background image is disabled.

21. The terminal of claim 18, wherein the set of program code, when executed by the one or more processors, causes the terminal to identify a fourth picture from local pictures stored in the terminal to replace the first picture with the fourth picture as the lock screen background image in the lock screen state.

22. The terminal of claim 18, wherein a lower right corner of the first lock screen interface comprises a quick entry to a photographing application, and wherein the terminal does not display the quick entry to the photographing application when the first lock screen configuration interface is displayed.

23. The terminal of claim 18, wherein the first lock screen configuration interface further comprises at least one of the following function options: an option for enabling and disabling a lock screen background image switching function, an option for sharing a lock screen picture on another terminal or a social network, an option for setting a picture type, or an option for specifying a network communication mode used when local pictures are updated.

24. The terminal of claim 18, wherein the first picture occupies a whole displaying area of the touch screen of the terminal.

25. The terminal of claim 18, wherein the first lock screen configuration interface overlays the first lock screen interface, and wherein both the first lock screen interface and the first lock screen configuration interface display a current time and date.

26. A computer program product comprising instructions stored on a non-transitory computer-readable medium that, when executed by one or more processors, cause a terminal to:
in response to lighting up a touch screen of the terminal, display a first lock screen interface on the touch screen of the terminal with the terminal being in a lock screen state without displaying a first lock screen configuration interface simultaneously, wherein the first lock screen interface shows a first picture as a lock screen background image, and wherein the first lock screen interface does not comprise a first text introduction of the lock screen background image or a first function option for commenting on the lock screen background image;
receive, while displaying the first lock screen interface without displaying the first lock screen configuration interface, a first touch input on the first lock screen interface;
after displaying the first lock screen interface without displaying the first lock screen configuration interface and in response to receiving the first touch input on the first lock screen interface, continue to display the first lock screen interface on the touch screen of the terminal and begin to display the first lock screen configuration interface on the touch screen of the terminal with the terminal remaining in the lock screen state, wherein the first text introduction of the lock screen background image is displayed on the first lock screen configuration interface, wherein the first lock screen configuration interface simultaneously displays the first function option for commenting on the lock screen background image and a second function option for displaying a second picture as the lock screen background image, wherein the first function option is represented by a heart-shaped icon, wherein the second function option comprises text indicating that selection of the second function option changes the lock screen background image from the first picture to the second picture, and wherein at least a portion of the first picture is visible when the first lock screen configuration interface is displayed;
in response to receiving a second touch input on the heart-shaped icon on the first lock screen configuration interface:
identify the first picture as a favorite;
obtain a search record and a browsing record of a user of the terminal;
analyze, by the terminal, the search record and the browsing record to obtain an analysis result;
send the analysis result and comment information of the first picture to a server, wherein the comment information is configured to instruct the server to send a third picture associated with the comment to the terminal when the server sends a next picture, and wherein the third picture is configured to be displayed on the touch screen of the terminal as the lock screen background image;
receive, based on the search record, the browsing record, the analysis result, and the comment information, the third picture from the server;
light up the touch screen of the terminal after receiving the third picture from the server; and
display the third picture on the touch screen of the terminal as the lock screen background image when the touch screen of the terminal is lit up; and
in response to receiving a third touch input on the second function option on the first lock screen configuration interface for displaying the second picture as the lock screen background image:
obtain the second picture and a second text introduction of the second picture; and
after obtaining the second picture and the second text introduction of the second picture, replace the first picture with the second picture as the lock screen background image on the touch screen of the terminal and replace the first text introduction with the second text introduction on the touch screen of the terminal.

27. The computer program product of claim 26, wherein the third picture is provided based on the first picture being identified as the favorite, and wherein the first lock screen interface displays a current date and a current time.

28. The computer program product of claim 26, wherein the one or more processors are further configured to execute the instructions to cause the terminal to disable switching of the lock screen background image in response to receiving a fourth touch input on the first lock screen configuration interface, and wherein the lock screen background image of the terminal remains unchanged after switching of the lock screen background image is disabled.

\* \* \* \* \*